US01265037B2

(12) United States Patent (10) Patent No.: US 12,650,537 B2

Anderson (45) Date of Patent: Jun. 9, 2026

(54) GRADIENT MATTER-WAVE GRADIOMETRY

(71) Applicant: ColdQuanta, Inc., Boulder, CO (US)

(72) Inventor: Dana Zachary Anderson, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 342 days.

(21) Appl. No.: 18/377,727

(22) Filed: Oct. 6, 2023

(65) Prior Publication Data

US 2024/0369734 A1 Nov. 7, 2024

Related U.S. Application Data

(60) Provisional application No. 63/416,065, filed on Oct. 14, 2022.

(51) Int. Cl.
*G01V 7/04* (2006.01)

(52) U.S. Cl.
CPC ...................................... *G01V 7/04* (2013.01)

(58) Field of Classification Search
CPC ................................... G01V 7/02; G01V 7/04
See application file for complete search history.

(56) References Cited

U.S. PATENT DOCUMENTS

| | | |
|---|---|---|
| 4,874,942 A | 10/1989 | Clauser |
| 4,897,844 A | 1/1990 | Schimpe |
| 6,476,383 B1 | 11/2002 | Esslinger |

| | | | |
|---|---|---|---|
| 9,791,593 B2 * | 10/2017 | Ammar | ..................... G01V 7/02 |
| 9,916,913 B2 | 3/2018 | Compton | |
| 2008/0007817 A1 | 1/2008 | Hochberg | |
| 2009/0046976 A1 | 2/2009 | Hillis | |
| 2013/0169157 A1 | 7/2013 | Arman | |
| 2016/0064108 A1 | 3/2016 | Saffman | |
| 2016/0141533 A1 | 5/2016 | Britt | |

(Continued)

FOREIGN PATENT DOCUMENTS

| | | | | |
|---|---|---|---|---|
| WO | WO-2020141536 A1 * | 7/2020 | ............ | G01P 15/093 |
| WO | WO-2020249974 A1 * | 12/2020 | ............... | G01V 7/00 |

OTHER PUBLICATIONS

Beer et al., Training Deep Quantum Neural Networks, Nature Communications, 2020, pp. 1-6.

(Continued)

*Primary Examiner* — Paul M. West
(74) *Attorney, Agent, or Firm* — Michael J. Attisha; Samuel Means; Greenberg Traurig, LLP

(57) ABSTRACT

Each atom in a population of atoms can be characterized by a probability density distribution (PDD). Using a shaken-lattice technique, each PDD is split into a pair of sub-PDDs. The sub-PDDs of a pair are propagated along different paths to a common endpoint of the paths, resulting in a matter-wave interference pattern that encodes a net phase between the paths, e.g., due to differential effects associated with a gravity gradient. The matter-wave interference pattern can be measured to yield a respective measurement for each atom. The measurements can be aggregated to yield a result distribution that can serve as a classical domain estimate of the quantum-domain matter-wave interference pattern, and thus of the gravity gradient. Other embodiments can determine gradients for other types of fields.

13 Claims, 8 Drawing Sheets

(56)                  References Cited

U.S. PATENT DOCUMENTS

| | | |
|---|---|---|
| 2017/0016710 A1 | 1/2017 | Black |
| 2017/0199036 A1 | 7/2017 | Moxley, III |
| 2020/0161016 A1 | 5/2020 | Anderson |
| 2020/0161446 A1 | 5/2020 | Anderson |
| 2022/0164501 A1 | 5/2022 | Nosanow |

OTHER PUBLICATIONS

Caliga et al., A Matterwave Transistor Oscillator, Department of Physics, University of Colorado, and JILA, Jan. 12, 2018, pp. 1-5.
Chih et al., Reinforcement-Learning-Based Matter-Wave Interferometer in a Shaken Optical Lattice, Physical Review Research 3, 2021, pp. 033279-1-033279-10.
Dana Z. Anderson, Mater Waves, Single-Mode Excitation of the Matter-Wave Filed, and the atomtronic Transistor Oscillator, Physical Review A 104, 033311 (2021), published Sep. 8, 2021.
Dinardo, Brad A.; "Single Atom Delivery into a Bottle Beam Trap Using an Optical Conveyor Belt and an Ultracold Gain Mechanism in a Matterwave Transistor Oscillator" A Thesis submitted to the Faculty of the Graduate School of the University of Colorado in partial fulfillment of the Requirements for the Degree of Doctor of Philosophy, Department of Physics, Boulder, Colorado, 2018.
Dupoint et al., Calibrating the Classical Hardness of the Quantum Approximate Optimization Algorithm, PRX Quantum 3, 2022, American Physical Society, pp. 040339-1-040339-14.
Graham et al., Demonstration of Multi-Qubit Entanglement and Algorithms on a Programmable Neutral Atom Quantum Computer, arXiv:2112.14589v3 [quant-ph] Feb. 11, 2022.
Huang et al., Quantum Advantage in Learning from Experiments, arXiv:2112.00778v1 [quant-ph] Dec. 1, 2021, pp. 1-52.
Jones et al., K-spin Hamiltonian for Quantum-Resolvable Markov Decision Processes, arXiv:2004.06040v1 [quant-ph] Apr. 13, 2020, pp. 1-9.
Liang-Ying Chih, Machine-Learning-Based Design of Quantum Systems for Extreme Sensing, Thesis, 2022, pp. 1-138.
Roy J. Glauber, Amplifiers, Attenuators, and Schrödinger's Cat $\sqrt{a}$, Dec. 18, 1985.
Weidner et al., Experimental Demonstration of Shaken Lattice Interferometry, arXiv:1801.09277v1 [quant-ph] Jan. 28, 2018, pp. 1-5.
Wikipedia, Atom Interferometer, Jan. 24, 2021.
Wikipedia, Coherent State, Jan. 24, 2021.
Wolfgang Ketterle, Atom Laser, McGraw-Hill 1999 Yearbook of Science & Technology.
Wolfgang Ketterle, "When Atoms Behave as Waves: Bose-Einstein Condensation and the Atom Laser," MIT—Harvard Center for Ultracold Atoms, Dec. 8, 2001. (Year: 2001).

* cited by examiner

Optical Lattice 110

102 Vacuum
Cell

110 Optical Lattice

110 Optical Lattice

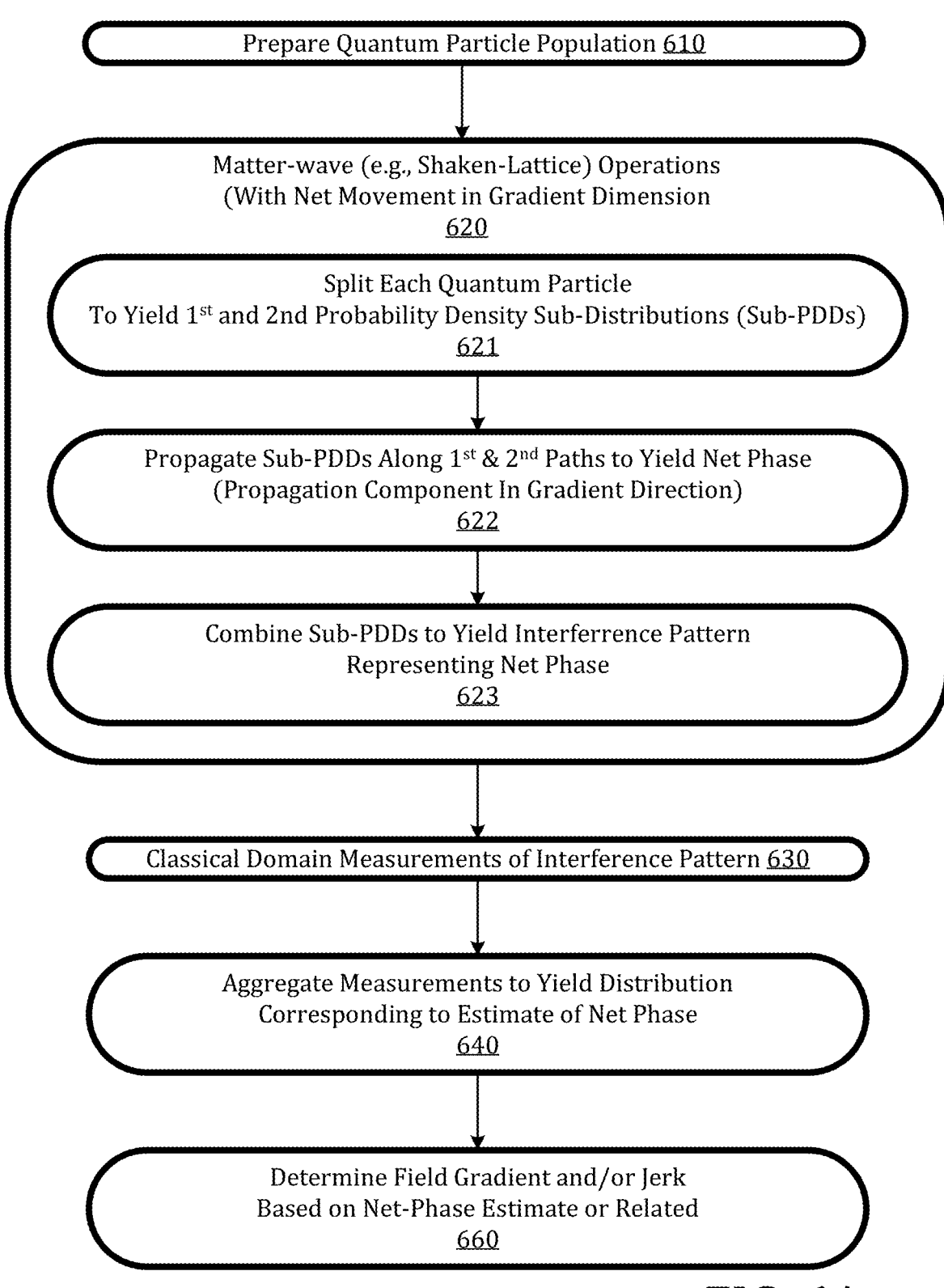

Gradient Matter-wave Interferometry Process 600

Prepare Quantum Particle Population 610

Matter-wave (e.g., Shaken-Lattice) Operations
(With Net Movement in Gradient Dimension
620

Split Each Quantum Particle
To Yield 1st and 2nd Probability Density Sub-Distributions (Sub-PDDs)
621

Propagate Sub-PDDs Along 1st & 2nd Paths to Yield Net Phase
(Propagation Component In Gradient Direction)
622

Combine Sub-PDDs to Yield Interferrence Pattern
Representing Net Phase
623

Classical Domain Measurements of Interference Pattern 630

Aggregate Measurements to Yield Distribution
Corresponding to Estimate of Net Phase
640

Determine Field Gradient and/or Jerk
Based on Net-Phase Estimate or Related
660

FIG. 6A

Propagation <u>622</u>

First Propagate
Sub-PDDs Along First Segments of First and Second Paths
Mid-Segment Reflections
Movement in Gradient Direction
(Phase Shift in First Direction)
<u>6221</u>

Transition From First Segments to Second Segments
Paths Intersect
<u>6222</u>

Second Propagate
Sub-PPDs Along 2nd segments of 1st & 2nd Paths
Mid-Section Reflections
Motion Component in Gradient Direction
Phase Shift in Opposite Direction
Resulting in Net Phase
<u>6223</u>

FIG. 6B

GRADIENT MATTER-WAVE GRADIOMETRY

CROSS REFERENCE TO OTHER APPLICATIONS

This application claims priority to U.S. Provisional Patent Application No. 63/416,065 entitled SHAKEN-LATTICE GRAVITY GRADIOMETRY filed Oct. 14, 2022 which is incorporated herein by reference for all purposes.

BACKGROUND OF THE INVENTION

The strength of a gravitational field can vary by position. Gravitational field strength above the Earth's surface is greater near the surface and weaker with distance above the surface. For a given distance above Earth's surface, the gravitational field is greater at the poles than at the equator. Gravitational strength and direction are affected by the presence of mountains. Gravitational strength is also affected by variations in Earth's density, e.g., due to mineral and metal deposits, water, caves, and tunnels. Accordingly, measurement of gravity and gravity gradients can be useful for mineral, oil, and gas exploration, border protection in the form of detection of tunnels, other national security applications, environmental monitoring for climate change, e.g., from space, and navigation.

Gravitational field strength can be measured using a gravimeter. In a common type of gravimeter, a mass is suspended by a spring. The action of a gravitational field acts on the mass, stretching the spring. The strength of the gravitational field can be determined from the degree to which the spring is stretched. Another type of gravimeter determines gravitation field strength as a function of the time it takes a mass to fall a given distance; the fall typically takes place in a vacuum to prevent ambient particles from applying friction to slow the fall. According to a Wikipedia article on "Gravimetry": "The current standard for sensitive gravimeters are the superconducting gravimeters, which operate by suspending a superconducting niobium sphere in an extremely stable magnetic field; the current required to generate the magnetic field that suspends the niobium sphere is proportional to the strength of the Earth's gravitational acceleration."

For many applications, including those listed above, changes in gravitational field strength with position, that is, the gravity gradient, is of greater interest than the gravitational strength itself. A conventional approach to gravity gradiometry uses two or more gravimeters at separate locations and takes appropriate differences of their measurements. However, there are substantial challenges to achieving meaningful sensitivity, and to eliminating systematic error sources among multiple gravimeters. What is needed is an approach to gravity gradiometry that helps eliminate or reduce such sources of errors.

BRIEF DESCRIPTION OF THE DRAWINGS

Various embodiments of the invention are disclosed in the following detailed description and the accompanying drawings.

FIG. 6A is a flow chart of a gradient matter-wave interferometry process implementable in the system of FIG. 1 and in other systems.

FIG. 6B is a flow chart of a propagation action of the process of FIG. 6A.

DETAILED DESCRIPTION

The present invention provides for gradient matter-wave interferometry. A probability density distribution (PDD) for an atom or other quantum particle is split. The resulting two sub-distributions (sub-PDDs) are respectively directed along first and second paths and recombined to form an interference pattern that is measured to identify a phase shift between the two sub-PDDs. A gradient of a parameter of interest is determined based on the phase difference. In a scenario in which the pair of sub-PDDs is not moved along a direction of interest, the measured phase shift can indicate a rate of change, that is, a time gradient, for the parameter of interest. In a scenario in which the pair of sub-PDDs is moved, the phase shift can measure a spatial gradient, e.g., a gravity gradient. Thus, only one "shot" of one device is required to measure a gravity or other gradient or rate of change; this is in contrast to the two devices conventionally required. One advantage of this one-shot approach is that there is no systematic error involved in synchronizing measurements across measurement devices.

Figure 1:
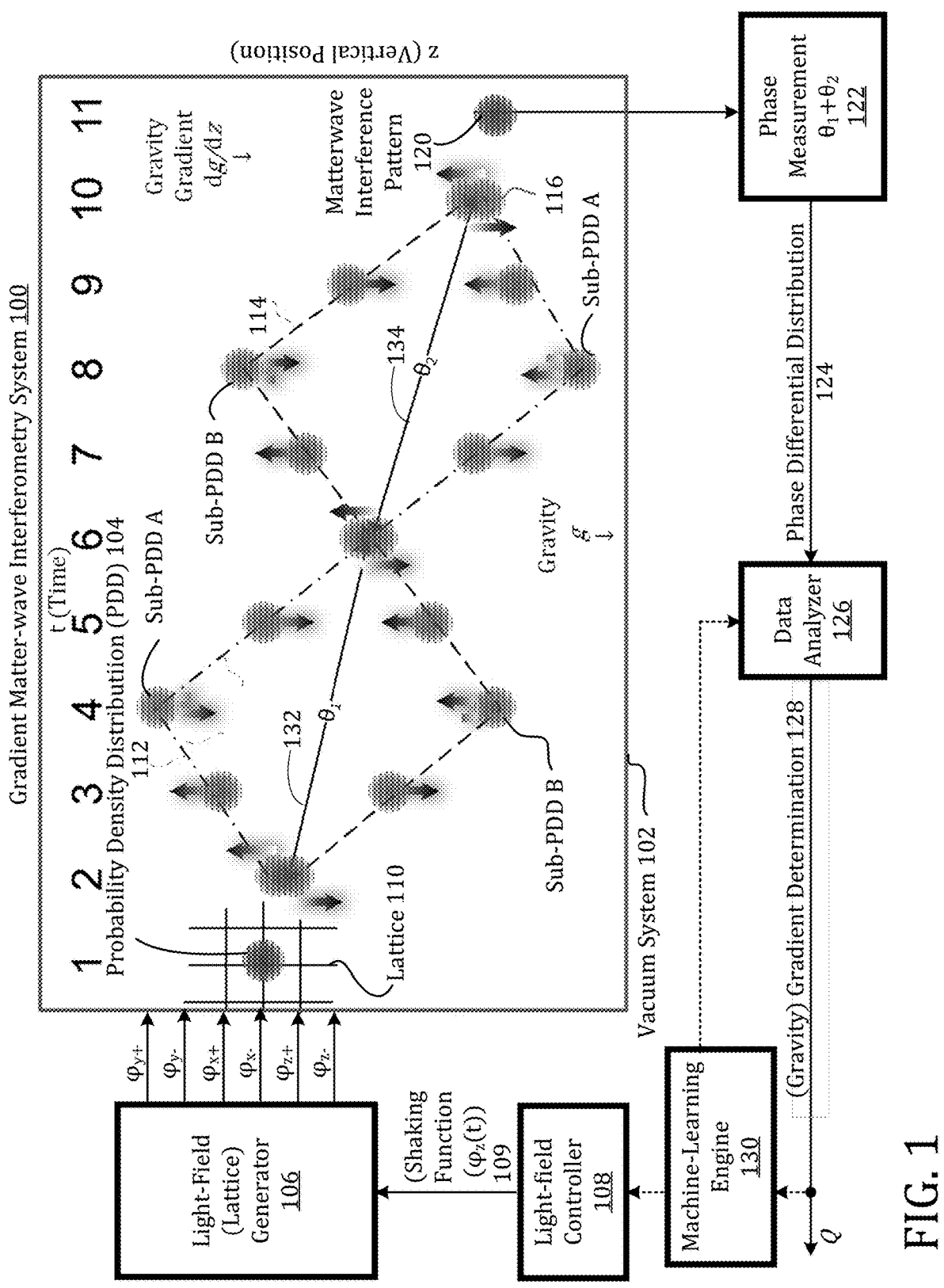
FIG. 1 is a schematic illustration of a gradient matter-wave interferometry system.

As shown in FIG. 1, a gradient matter-wave interferometry system 100 includes a vacuum system 102 containing a population of quantum particles, e.g., charged or neutral atoms or molecules. In this case, the quantum particles are neutral rubidium 87 ($^{87}$Rb) atoms. For expository purposes, only one atom is represented, in this case by an initial probability density distribution (PDD) 104. This PDD 104 is subsequently split into two sub-PDDs, PDD A and PDD B, that are shown at various times 1-11 during a measurement process. For most of these times, the sub-PDDs are shown separated so that the paths they take are clearly distinguishable. In most scenarios, however, there is no gap between the sub-PDDs. Instead, PDD 104 expands and compresses vertically while, overall, PDD 104 travels in a downward z direction.

Figure 2:
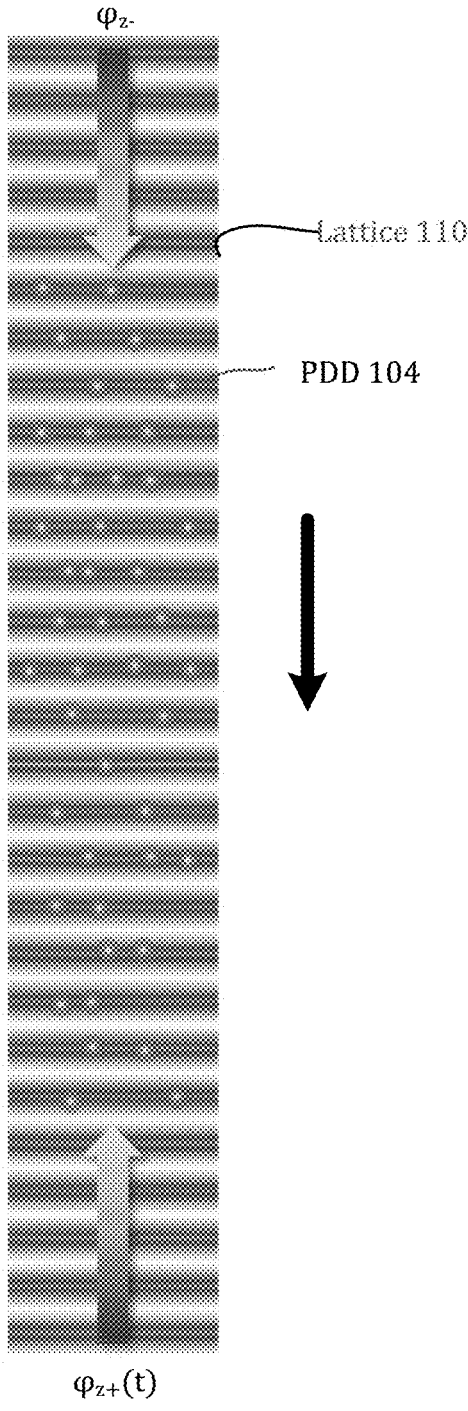
FIG. 2 is a screen shot of a one-dimensional lattice populated by quantum particles represented by their probability density distributions (PDDs). Note that all lattices producible by the system of FIG. 1 are given the same numerical label (110).
Figure 3A:
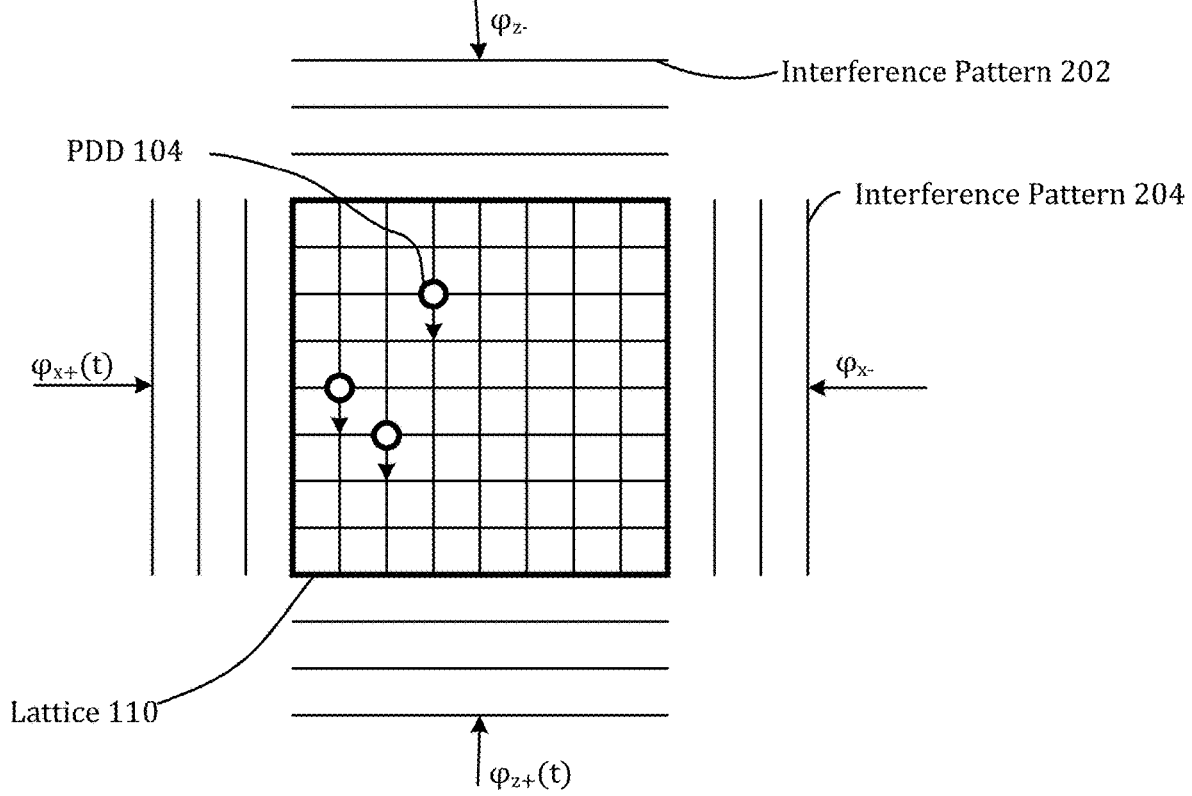
FIG. 3A is a wireframe perspective view of a three-dimensional optical lattice.
Figure 3B:
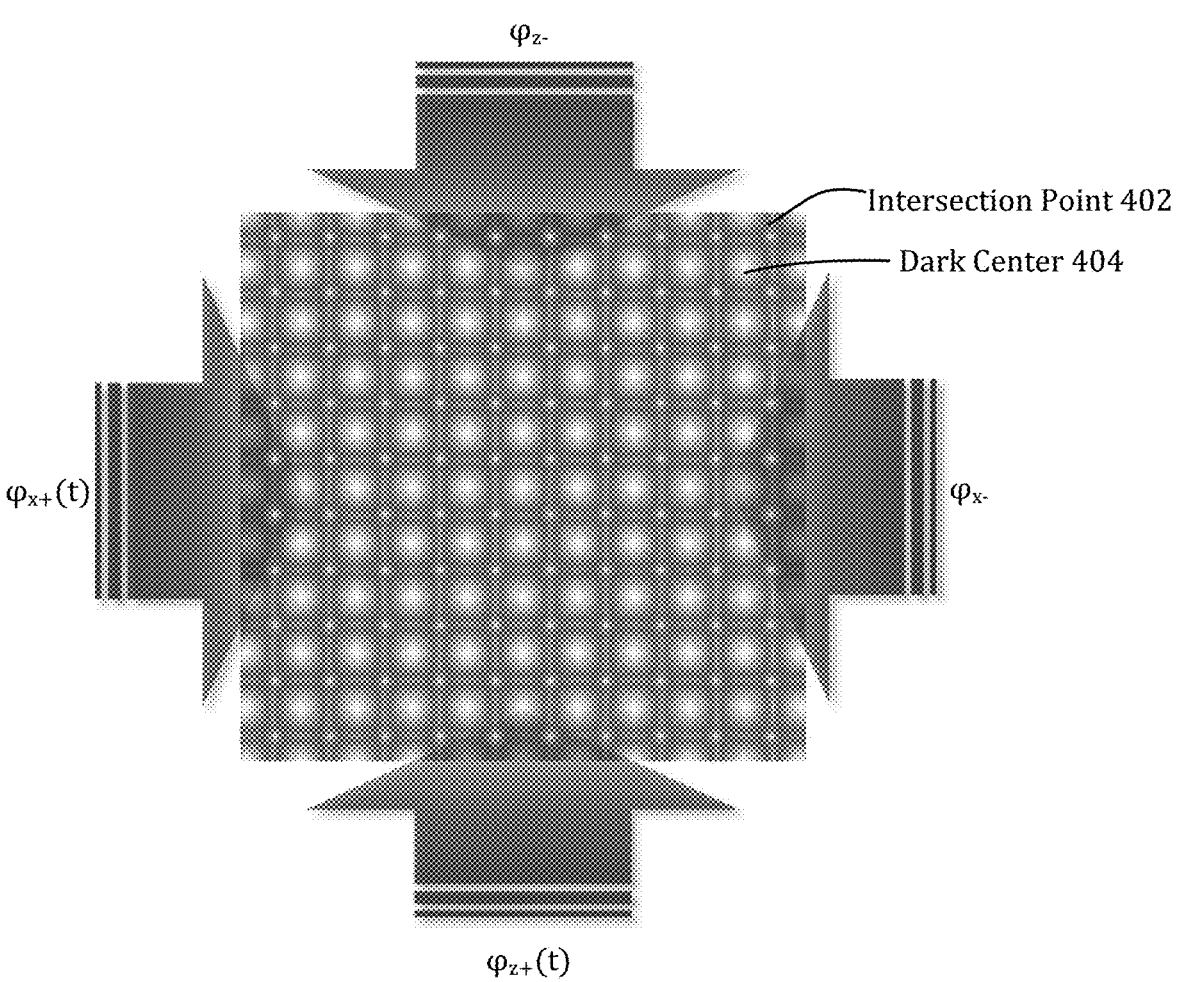
FIG. 3B is a screen shot perspective of a three-dimensional optical lattice.

A light-field generator 106 is used to control the position, motion, and quantum states of the quantum particles according to control signals received from a light-field controller 108. In the illustrated embodiment, light field generator 106 generates an optical lattice 110 to trap the quantum particles. Lattice 110 can be conceptualized as a one-dimensional optical lattice 110 formed as an interference pattern of counter-propagating laser beams $\varphi_{z+}$ and $\varphi_{z-}$, as shown in FIG. 2. Note that the quantum particles (represented by their respective PDDs 104) bind to the bright interference fringes of the counter-propagating laser beams, which are red-detuned with respect to a resonance of the quantum particles. In practice a three-dimensional lattice such as the ones shown in FIGS. 3A and 3B is used to provide three-dimensions of confinement even though the shaking can be along only the z dimension. Alternative embodiments use 1D or 2D lattices with confinement in other dimensions being provided by non-lattice type fields.

Light-field controller 108 (FIG. 1) applies a shaking function 109 to control the quantum particles by modulating optical lattice amplitudes and phases. Lattice 110 is shaken causing PDD 104 to be split into sub-PDDs A and B. As execution of the shaking function continues, sub-PDD A propagates along a first path 112 and sub-PDD B propagates along a second path 114. Paths 112 and 114 terminate at an end-point 116, at which sub-PDDs A and B recombine. The result is an interference pattern 120 that represents a net phase differential between sub-PDDs A and B due to opposing phase differences $\theta_1$ and $\theta_2$ accrued during propagation.

A phase measurement function 122 evaluates the net phase shift $(\theta_1+\theta_2)$ represented by interference pattern 120. For example, the atoms associated with interference pattern 120 can be stimulated to an energy level so that they fluoresce upon decay. Lattice 110 can be terminated, e.g., by turning off the lasers used to implement the lattice. The atoms associated with interference pattern 120 can be allowed to fall under the influence of gravity. An image of the fluorescing atoms can be taken after a predetermined time of flight. The result is a phase differential distribution 124 that can serve as an estimate of the net phase. A data analyzer 126 converts the net phase determination into a gravity gradient determination 128, which is provided as a system output Q.

A machine-learning engine 130 is used to pretrain the shaking function ($\varphi_z(t)$) 109 selected by light field controller 108 and a conversion function $f$, where $dg/dz=f(\theta_1+\theta_2)$, used by data analyzer 126, e.g., during a calibration session involving known gravitational gradients. Machine-learning engine 130 can also be used during normal operation in an adaptive mode to update shaking functions in light-field controller 108 and conversion functions in data analyzer 126.

Other embodiments do not use a shaking function but rather other techniques, e.g., Bragg, Raman, for causing quantum particles to traverse path pairs such as paths 112 and 114 in FIG. 1. In addition, the invention provides for embodiments that can measure jerk (acceleration gradient), as well as electric, magnetic, and/or electro-magnetic field gradients. In some examples, the quantum particles are ionized (electrically charged) quantum particles and/or Rydberg particles.

Figure 4A:
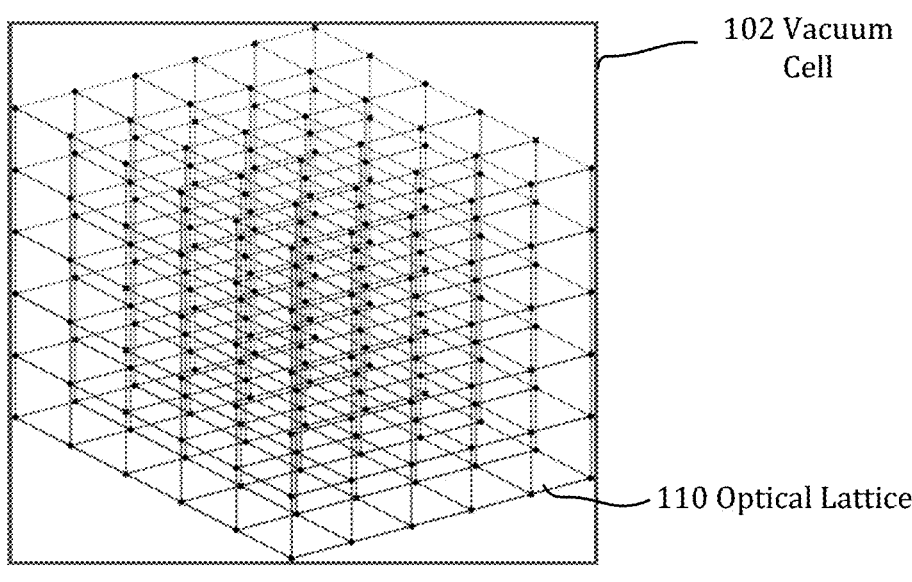
FIG. 4A is a two-dimensional illustration of an optical lattice.
Figure 4B:
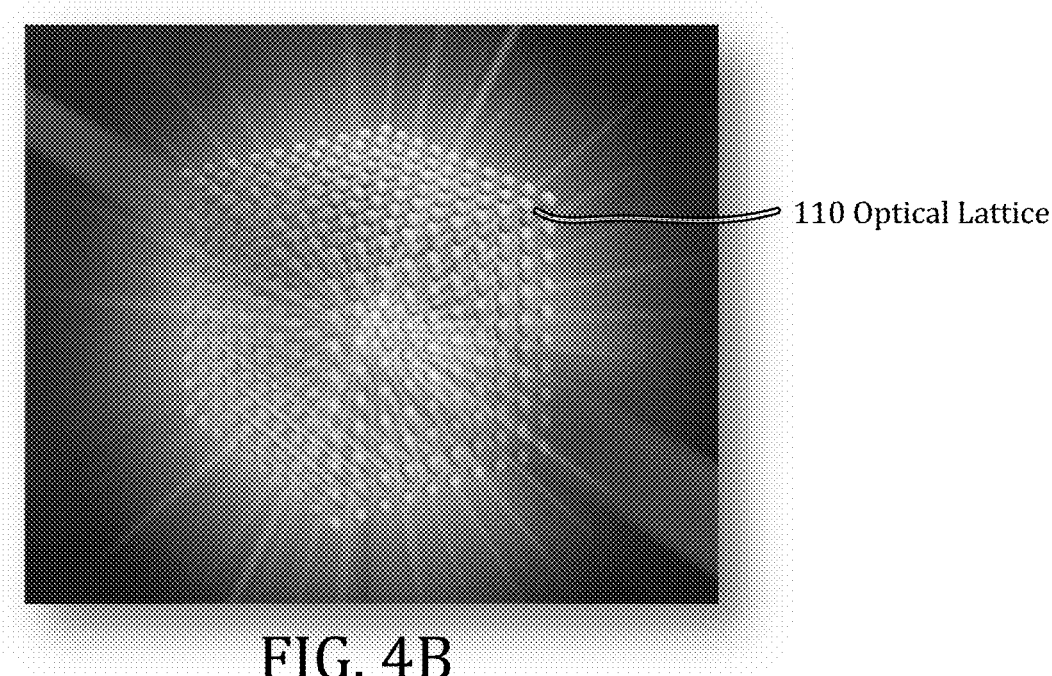
FIG. 4B is a screen shot of a two-dimensional representation of an optical lattice.

As shown in FIGS. 4A and 4B for x and z dimensions, lattice 110 is formed by intersecting mutually orthogonal interference patterns 202 and 204. Interference pattern 202 is formed by counter-propagating vertical laser beams $\varphi_{z+}$ and $\varphi_{z-}$ as also shown in FIG. 2. Interference pattern 204 is formed by counterpropagating horizontal laser beams $\varphi_{x+}$ and $\varphi_{x-}$. As shown in FIG. 4A, atoms represented by PDDs 104, are attracted to the bright intersections 402 of the interference patterns. A y dimension interference pattern, which extends in and out of the page of FIG. 3, is also formed by counter propagating in and out of page laser beams $\varphi_{y+}$ and $\varphi_{y-}$ (FIG. 1).

Laser beams $\varphi_{x+}$, $\varphi_{x-}$, $\varphi_{y+}$, $\varphi_{y-}$, $\varphi_{z+}$, and $\varphi_{z-}$ are red-detuned with respect to a resonance transition of quantum particles associated with PDDs 104, 206, and 208. Accordingly, the quantum particles are attracted to and trapped by the bright intersection points 402 (FIGS. 4A and 4B) of interference patterns 202 and 204 (and the y-axis interference pattern). Alternatively, blue-detuned laser beams or a combination of blue and red detuned laser beams can be used. Quantum particles are repelled by the blue-detuned laser beams and so are trapped in the dark spaces 404 (FIG. 4B) between bright intersections. 402. The trapping forces can be of the order of one or two orders greater than the gravity at Earth's surface.

Lattice 110 can be shaken by modulating the relative phase and/or amplitude of one or more of the constituent laser beams. For each counter-propagating pair of laser beams, relative phase can be controlled by controlling the phase of either one or both of the counter-propagating laser beams. Accordingly, in FIGS. 4A and 4B, $\varphi_{x+}$ and $\varphi_{z+}$ are indicated as time dependent, while $\varphi_{x-}$ and $\varphi_{z-}$ are indicated as constant. If a dimension is aligned with the gradient, only the corresponding dimension of lattice 110 need be shaken. For the example of FIG. 1, the gradient is in the z-down direction, so only $\varphi_{z+}$ needs to be modulated.

For example, modulating laser beam $\varphi_{z+}$ so that it increasingly lags laser beam $\varphi_{z-}$ causes horizontal bright lines of interference pattern 202 (FIG. 4A) and the trapped quantum particles to progress downward on an optical conveyor belt. Such a downward motion is a component of the motion of PDD 104 and is the reason that the location of matter-wave interference pattern 120 is lower (in FIG. 1) than the initial position of PDD 104. It is this change of vertical position that allows system 100 to compare gravity at different vertical positions so that the gravity gradient can be estimated. Since Lattice 110 is three-dimensional, a gradient in any direction can be accommodated by modulating the corresponding laser or combination of lasers. Alternatively, the x, y, and z components of a gradient can be measured in separate runs and combined to determine both the direction and magnitude of the gradient.

Figure 5:
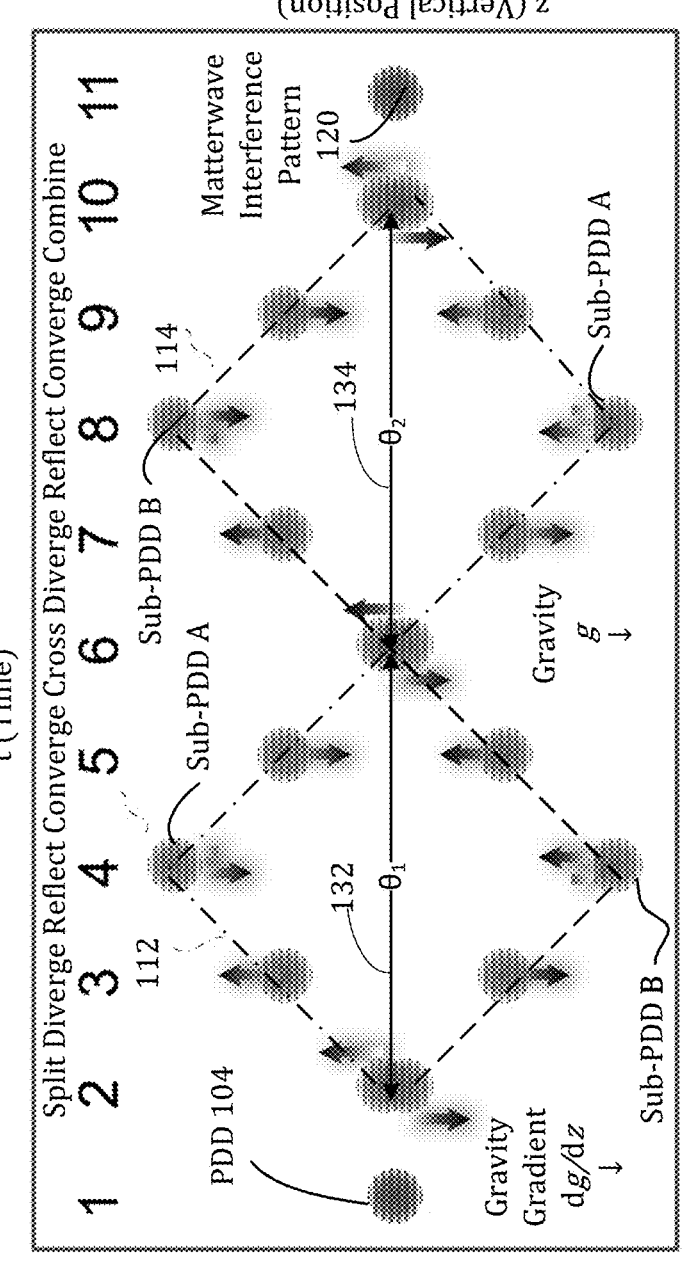
FIG. 5 is a schematic illustration of the gradient matter-wave interferometry system of FIG. 1 used to determine a time gradient of gravity.

Without the change in vertical position, system 100 can be used to detect a temporal (as opposed to spatial) gradient of gravity dg/dt. In addition, without the change in vertical position, a spatial gradient can be detected in the event that the interferometer is moved relative to the gravitational field. FIG. 5 represents operations implemented by shaking lattice 110 other than the net downward motion. These operations include splitting PDD 104 into two sub-PDDs A and B at time 2 in FIG. 5, propagating the sub-PDDs in diverging directions at time 3, reflecting the sub-PDDs at time 4 so that they propagate in converging directions and cross at time 6, completing the first sections of the respective paths 112 and 114. Assuming gravity strength increases as vertical position decreases, sub-PDD B lags sub-PDD A by an amount $\theta_1$ that corresponds to an average gravitational strength experienced by the first path sections.

The sub-PDDs pass each other at time 6 to begin the second sections of the paths by propagating in diverging directions at time 7. The sub-PDDs are reflected at time 8 whence they propagate in converging directions through time 9. They are then recombined at time 10, resulting in matter-wave interference pattern 120. As with the first path sections, the sub-PDD traversing the lower path section can experience a greater gravitational strength than the sub-PDD traversing the upper second path second section, resulting in a phase difference $\theta_2$ over the second sections. In this case, sub-PDD A lead over sub-PDD B decreases; in other words, the sense of phase shift $\theta_2$ is opposite that of phase shift $\theta_1$. The two phase shifts can be equal and opposite, resulting in a zero-gradient readout. In this case, system 100 can detect a time gradient of gravity. The splitting, propagating, crossing, reflecting, and combining are all implemented by lattice shaking. In other embodiments, these operations are implemented without shaking a lattice, e.g., using light-field gradients and/or Raman or other scattering.

In some cases, sub-PDDs A and B can interact with each other undesirably as they pass each other at time 6. Such undesirable interactions are most likely when the lattice is fully populated with quantum particles. Accordingly, in embodiments, the lattice is only sparsely populated, that is, less than half of its sites are occupied with quantum particles. However, a sufficient number of quantum particles is desired to attain a useful estimate of the phase difference represented by interference pattern 120 and thus an accurate estimate of the gravitational gradient.

A gradient matter-wave interferometry process 600, flow-charted in FIG. 6A begins with preparing a quantum particle population at 610. This can include laser and otherwise cooling of the quantum particles to limit their kinetic energy and trapping them in an optical lattice. At 620, shaken-lattice, or alternative operations, are performed. These operations include splitting a PDD for each quantum particle into first and second sub-PDDs at 621, propagating PDDs along first and second paths to yield a (zero or non-zero) net phase at 622, and combining PDDs to yield an interference pattern representing the net phase. In spatial-gradient embodiments, a net motion along a gradient can be included. Classical domain measurements are made of the interference pattern at 630. The measurements are aggregated at 640 to yield a distribution of measurement results that corresponds to the quantum-domain net phase. At 650, a field gradient or jerk is determined based on the net phase estimate or related parameter.

Propagation 622 is shown in greater detail in FIG. 6B. At 6221, sub-PDDs are propagated along first sections of first and second paths. Each section includes a diverging segment, a reflection, and a converging segment. These segments can be strait-line or curved segments. To measure a spatial gradient, the PDD centroid can be gradually moved in the direction of the gradient. At 6222, there is a transition between the first sections and second sections of the paths at which the paths cross. At 6223 the sub-PDDs traverse second sections, both of which include a mid-section reflection. Typically, the sub-PDDs in the second sections undergo a phase shift in a direction opposite to that of the first sections, resulting in a net phase which is represented by a matter-wave interference pattern upon recombination.

Herein a "quantum particle" is a molecular entity in a context in which the particle's quantum characteristics play an essential role. A "molecular entity" is "any constitutionally or isotopically distinct atom, molecule, ion, ion pair, radical, radical ion, complex, conformer, etc., identifiable as a separately distinguishable entity". The molecular entities of greatest interest herein are neutral and charged atoms and molecules. The context herein involves the formation of matter-wave interference patterns in which context the matter-wave characteristics are among the quantum characteristics that play an essential role.

In the illustrated embodiments, the PDDs of quantum particles are split into two sub-PDDs, the weighted centers of which traverse different paths: beginning at a common split point, diverging, reflecting, converging, passing at a common crossing point, diverging, reflecting, and recombining at a common recombination point. Each sub-PDD path includes a first section from the split point to the crossing point and a second section from the crossing point to the recombination point. Each section includes a diverging segment, a reflection, and a converging segment in that order. A reflection can be instantaneous or consume some non-zero duration. The segments can be straight or curved.

In addition to the sub-PDD paths, one can consider the PDD path, which is the path of the weighted center of the PDD from the split point to the recombination point (aka endpoint). The PDD can be divided into a first PDD section 132 (shown in FIGS. 1, 3 and 4) from the split point to the crossing point and a second PDD section 134 from the crossing point to the recombination point. In the figures, both PDD sections are constituted by a respective relatively straight-line segment, without the mid-section reflection that characterizes the sub-PDD path sections.

Herein, an "optical lattice" is a grid constituted by light. In the illustrated embodiment, the optical lattice is constituted by an optical interference pattern or an intersection of optical interference patterns, with each interference pattern resulting from interference of counter-propagating laser beams. However, there are other ways to make an optical lattice: for example, orthogonal sets of parallel laser beams can intersect to create an optical lattice.

Herein, "based on A" means "as a function of A or an independent variable derived from A". If an outcome is a function of more than one independent variable, it is "based on" each of the independent variables. Herein, "sense" refers to a choice between "positive" and "negative". Thus, if two senses are "opposite", they offset each other when added.

Depending on the embodiment, the vacuum system can maintain high vacuum (HV) pressures (less than $10^{-3}$ Torr), very high vacuum (VHV) pressures (less than $10^{-6}$ Torr), and/or ultra-high vacuum (UHV) pressures (less than $10^{-9}$ Torr). Also depending on the embodiment, quantum particles can be laser and/or otherwise cooled to cold temperatures (less than one millikelvin), very cold temperatures (less than one microkelvin), and/or ultra-cold temperatures (less than 100 nanokelvin).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the accompanying description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Although the foregoing embodiments have been described in some detail for purposes of clarity of understanding, the invention is not limited to the details provided. There are many alternative ways of implementing the invention. The disclosed embodiments are illustrative and not restrictive.

Herein, art labelled "prior art, if any, is admitted prior art; art not labelled "prior art", if any, is not admitted prior art. The illustrated embodiments, variations thereupon and modifications thereto are provided for by the present invention, the scope of which is defined by the accompanying claims.

What is claimed is:

1. A matter-wave interferometry process comprising:
   splitting a probability amplitude distribution (PDD) of a quantum particle into a first sub-PDD and a second sub-PDD;
   first propagating the first sub-PDD along a first section of a first path and the second sub-PDD along a first section of a second path so as to establish a first phase difference between the first sub-PDD and the second sub-PDD, the first phase difference having a first sense;
   second propagating the first sub-PDD along a second section of the first path and the second sub-PDD along a second section of the second path so as to establish a second phase difference between the first sub-PDD and the second sub-PDD, the second phase difference having a second sense opposite the first sense;
   at a common endpoint of the first path and the second path, combining the first sub-PDD and the second sub-PDD to generate an interference pattern representing a net phase corresponding to a difference in magnitudes of the first phase difference and the second phase difference; and
   determining a field gradient or a jerk magnitude or a combination of the field gradient and the jerk magnitude based on the net phase.

2. The matter-wave interferometry process of claim 1, wherein the quantum particle is an atom.

3. The matter-wave interferometry process of claim 1, wherein the splitting, the first propagating, the second propagating and the combining are implemented using a shaken lattice.

4. The matter-wave interferometry process of claim 1, wherein the determining includes determining a temporal field gradient.

5. The matter-wave interferometry process of claim 1, wherein the determining includes determining a spatial field gradient.

6. The matter-wave interferometry process of claim 5, wherein the field gradient has a field-gradient magnitude and a field-gradient direction.

7. The matter-wave interferometry process of claim 6, wherein during the first propagating and during the second propagating, a shaken lattice functions as an optical conveyor belt propelling the PDD along the field-gradient direction.

8. The matter-wave interferometry process of claim 1, wherein each of the first section of the first path, the first section of the second path, the second section of the first path, and the second section of the second path includes a respective reflection.

9. A matter-wave interferometry system comprising:
   a vacuum system for maintaining a population of quantum particles in a vacuum of pressure below one millikelvin, the quantum particles having respective probability amplitude distributions (PDDs); and
   a controller for performing the following operations for each quantum particle of the population of quantum particles:
      splitting a probability amplitude distribution (PDD) of the quantum particle into a first sub-PDD and a second sub-PDD;
      first propagating the first sub-PDD along a first section of a first path and the second sub-PDD along a first section of a second path so as to establish a first phase difference between the first sub-PDD and the second sub-PDD, the first phase difference having a first sense;
      second propagating the first sub-PDD along a second section of the first path and the second sub-PDD along a second section of the second path so as to establish a second phase difference between the first sub-PDD and the second sub-PDD, the second phase difference having a second sense opposite the first sense; and
      at a common endpoint of the first path and the second path, combining the first sub-PDD and the second sub-PDD to generate an interference pattern characterized by a net phase corresponding to a difference in magnitudes of the first phase difference and the second phase difference;
   a measurement system for converting the interference pattern from a quantum domain to a classical domain to yield an estimate of the net phase in a form of a distribution of measurement results; and
   a data analyzer for converting the distribution of measurement results into a value of a field gradient or into a value of a jerk or a value of a combination of the field gradient and the jerk.

10. The matter-wave interferometry system of claim 9, wherein the controller includes a lattice generator for generating an optical lattice within the vacuum system, the controller causing the population of quantum particles to be trapped by the optical lattice, the controller modulating the optical lattice so as to implement the splitting, the first and second propagating, and the combining.

11. The matter-wave interferometry system of claim 10, wherein the controller modulates the optical lattice so as to impart a motion on the PDD along a direction of the field gradient.

12. The matter-wave interferometry system of claim 9, wherein the field gradient is a gravitational, magnetic, electrical, or electro-magnetic field gradient.

13. The matter-wave interferometry system of claim 9, wherein the quantum particles are atoms or molecules.

* * * * *